Oct. 16, 1962 S. L. MERKEL 3,059,061

TELEPHONE SIGNALING FREQUENCIES GENERATOR

Filed June 26, 1959

4 Sheets-Sheet 1

INVENTOR.
STEPHEN L. MERKEL

BY John H. Snirel
ATT'Y

Oct. 16, 1962 S. L. MERKEL 3,059,061

TELEPHONE SIGNALING FREQUENCIES GENERATOR

Filed June 26, 1959 4 Sheets-Sheet 2

INVENTOR.
STEPHEN L. MERKEL

BY John H. [signature]
ATT'Y

INVENTOR.
STEPHEN L. MERKEL
BY John H. Smith
ATT'Y

INVENTOR.
STEPHEN L. MERKEL
BY John H. Smith
ATT'Y

United States Patent Office 3,059,061

Patented Oct. 16, 1962

3,059,061
TELEPHONE SIGNALING FREQUENCIES GENERATOR

Stephen L. Merkel, Lakewood, Ohio, assignor to Lorain Products Corporation, a corporation of Ohio Filed June 26, 1959, Ser. No. 823,142
9 Claims. (Cl. 179—84)

My invention relates to signaling systems and is directed more particularly to such a system adapted to telephony.

In a telephone system an important requirement, beyond the prime purpose of transmitting intelligence, is the incorporation of a signaling system whereby the calling subscriber, the called subscriber and operating personnel are all immediately and reliably advised of the operating condition of the circuit encountered at the moment a call is placed. Among other things, these telephone circuit conditions include a busy condition at the called station, a ready condition signified by a dial tone indicating that the circuit is in readiness to receive impulses from the dialing operations of the calling party and an all trunks busy condition. Additionally, it is necessary to provide what is known as audible ring back signifying to the calling subscriber that the called subscriber is being signaled by the ringing operation, a coin collect signal indicating that a pay station has received the required coins from the calling subscriber and a coin return signal indicating that coins previously deposited have been returned to the calling party if conditions require such an operation. Furthermore, it is necessary, for the economical distribution of available ringing power to the largest possible number of subscriber lines, to establish a commutated ringing pattern, for instance, one second on and three seconds off. The latter pattern is utilized in the present disclosure for purposes of illustration as exemplary of a wide variety of ringing patterns which may be established by my invention.

The frequencies commonly utilized include 20 cycles per second for ringing as modified by the particular ringing group pattern established; low tone, usually 600 cycles per second modulated at 120 cycles per second for busy tone, all trunks busy tone and dial tone signals, busy tone being supplied at 60 impulses per minute and all trunks busy tone being supplied at 120 impulses per minute; high tone, usually 500 cycles per second for indicating operator trunking and, as explained above, audible ring back for indicating to the calling subscriber that the called subscriber's phone is ringing, usually 420 cycles per second modulated at 40 cycles per second supplied in accordance with the established ringing pattern.

In order to reduce the number of frequency sources necessary to obtain the wide variety of signals needed in the operation of a telephone system, a limited number of frequencies such as the foregoing are subjected to various interruption patterns characterized by a given number of impulses per second for tone signals or by a given number of seconds "on" and a given number of seconds "off" for commutated ringing.

It is an object of the present invention to provide a new and improved system for establishing interruption and ringing patterns as described above.

The generation of signaling patterns and commutated ringing patterns has been obtained in the past by the use of mechanical and electro-mechanical devices, the maintenance of which presents a serious problem to the telephone industry.

One such arrangement includes a bank of motor rotated cams, each cam having a varying peripheral configuration to apply make and break action of predetermined periodicity to a series of contactors to establish a combination of ringing and tone patterns desired. In utilizing a mechanism as described above, some telephone systems require a wide variety of signals and thus an extremely large number of these cams.

Such a system requires constant maintenance due to the deterioration of cam surfaces from the original configuration as caused by eventual wear; failure of the motor which rotates the cam bank; burning and sticking of contact points through which the interruption pattern is obtained; weakening or breakage of contact springs; the need for adjusting the spacing between contact points even though they are not deteriorated and finally, loss of co-ordination of the various interruption patterns due to cam misalignment caused by rotation of the individual cams with respect to each other and with respect to the shaft on which they are mounted and by which they are rotated.

Additionally, in the event that a cam located inwardly on the shaft requires service or replacement, it must be removed from the shaft. Thus it is necessary to first remove from the shaft all other cams located outwardly of the cam to be serviced. Thereafter, upon replacement, the long and tedious operation of rotary alignment of all previously removed cams becomes necessary before the signaling and ringing functions of the telephone system can be resumed.

Another system presently available to establish predetermined interruption periodicity is the use of relay-dashpot combinations. However, again, the prolonged fidelity of the established signaling pattern is lost from time to time due to component failure and ambient temperature variations.

Accordingly, it is another object of my invention to provide an improved telephone signaling system which avoids the objectionable features enumerated above.

Still another object of my invention is to provide an improved telephone signaling system of the above character utilizing semiconductor circuit components.

Another object of my invention is to provide an improved signaling system which operates without the use of any moving parts and thereby is not subject to component breakdown and misalignment or to deterioration due to wear from extended usage.

Still another object of my invention is to provide a telephone signaling and ringing arrangement wherein, through static means, both signaling and ringing patterns are established with predetermined character and with accuracy from a single pulsing system, the pulses of which do not vary with ambient temperature.

It is another object of my invention to provide an improved telephone signaling and ringing system, the signaling and ringing patterns of which are supplied with extreme accuracy and fidelity from a pulsing system energized by a pulse generator whereby the accuracy of the pulse generator having been established, the desired, coordinated signaling and ringing patterns at the output of the system are assured.

It is a further object of my invention to provide, in combination with a minimum number of frequency generating elements, a telephone signaling system which is static in nature to provide maximum signaling combinations, the system including pulse generation means, pulse modifying means, means for combining the output of the multiplicity of pulse modifying means and gate elements to provide maximum telephone signaling facilities requiring a minimum of maintenance or service for continued, reliable operation.

A further object of my invention is to provide, in a telephone signaling system of the above character, associated pulse generator means and pulse modifier means for establishing signal-interruption patterns and static means for receiving the output of said pulse modifying means for generating a time-position ringing group pattern.

More specifically it is an object of my invention to provide, in a telephone signaling system, the improvement which comprises, in combination with a source or sources of frequency and gating elements, an improved arrangement comprising a pulse generator adapted to provide an initial pulse pattern with extreme fidelity and pulse frequency dividing means responsive to the pulse output of said pulse generator, together with translating means for co-ordinating the pulse output of a plurality of pulse frequency dividers thereby to establish a ringing group pattern.

It is still another object of my invention to provide a signaling system of the above character wherein transistors are utilized for obtaining various signaling patterns desired.

Still another object of my invention is to provide, in a pulse generator, an electrically unidirectional device whereby reverse leakage currents are prevented from reducing the fidelity of the established signaling pattern.

A further object of my invention is to provide in a signaling system of the above character, a source of bias current available, when required, to more positively drive controlling transistors in the circuit to "off" or nonconducting condition.

Other objects and advantages of my invention will become apparent from the following description and accompanying drawings in which.

Figure 5:
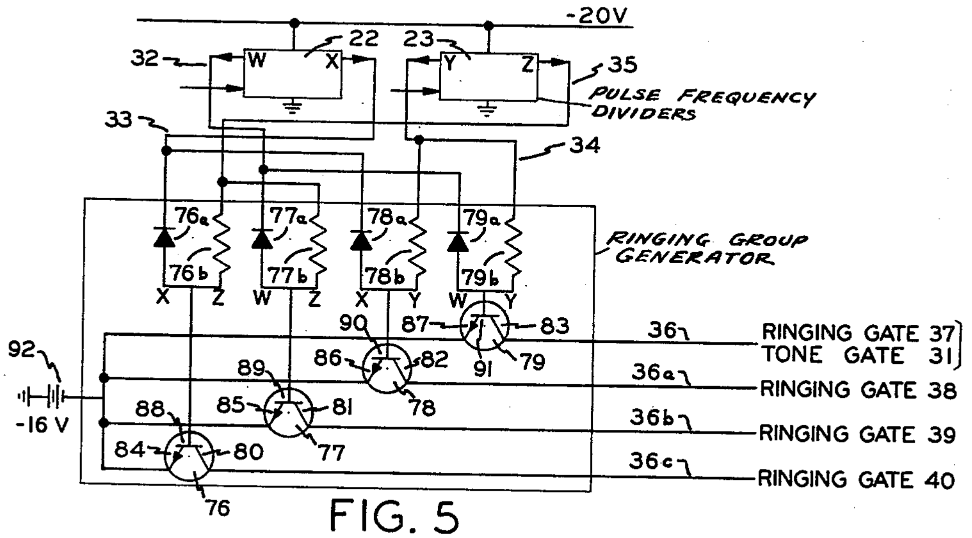
FIGURE 5 is a schematic diagram of a translator circuit wherein the pulse output of a plurality of pulse frequency dividers is converted into a commutated ringing pattern.
Figure 8:
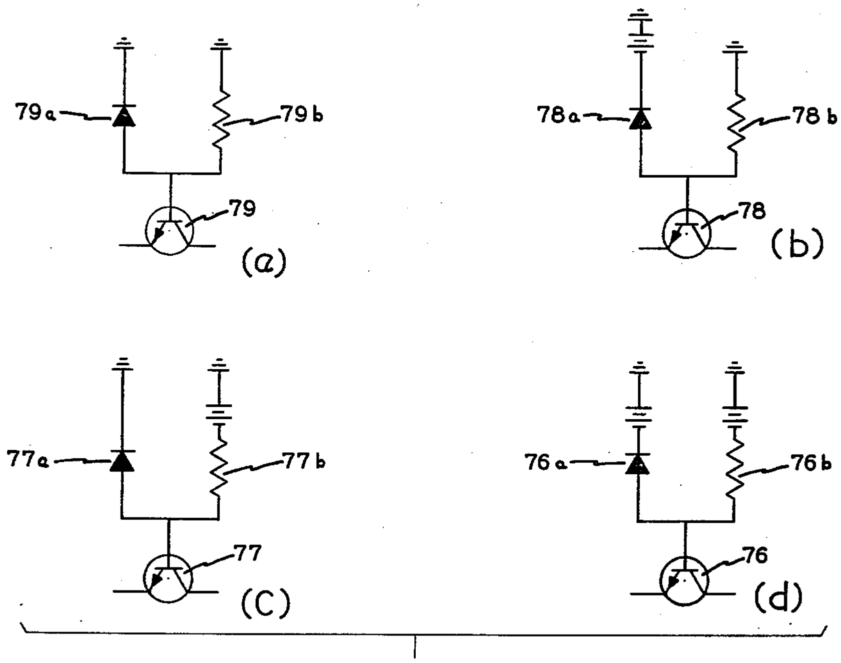
Figure 9:
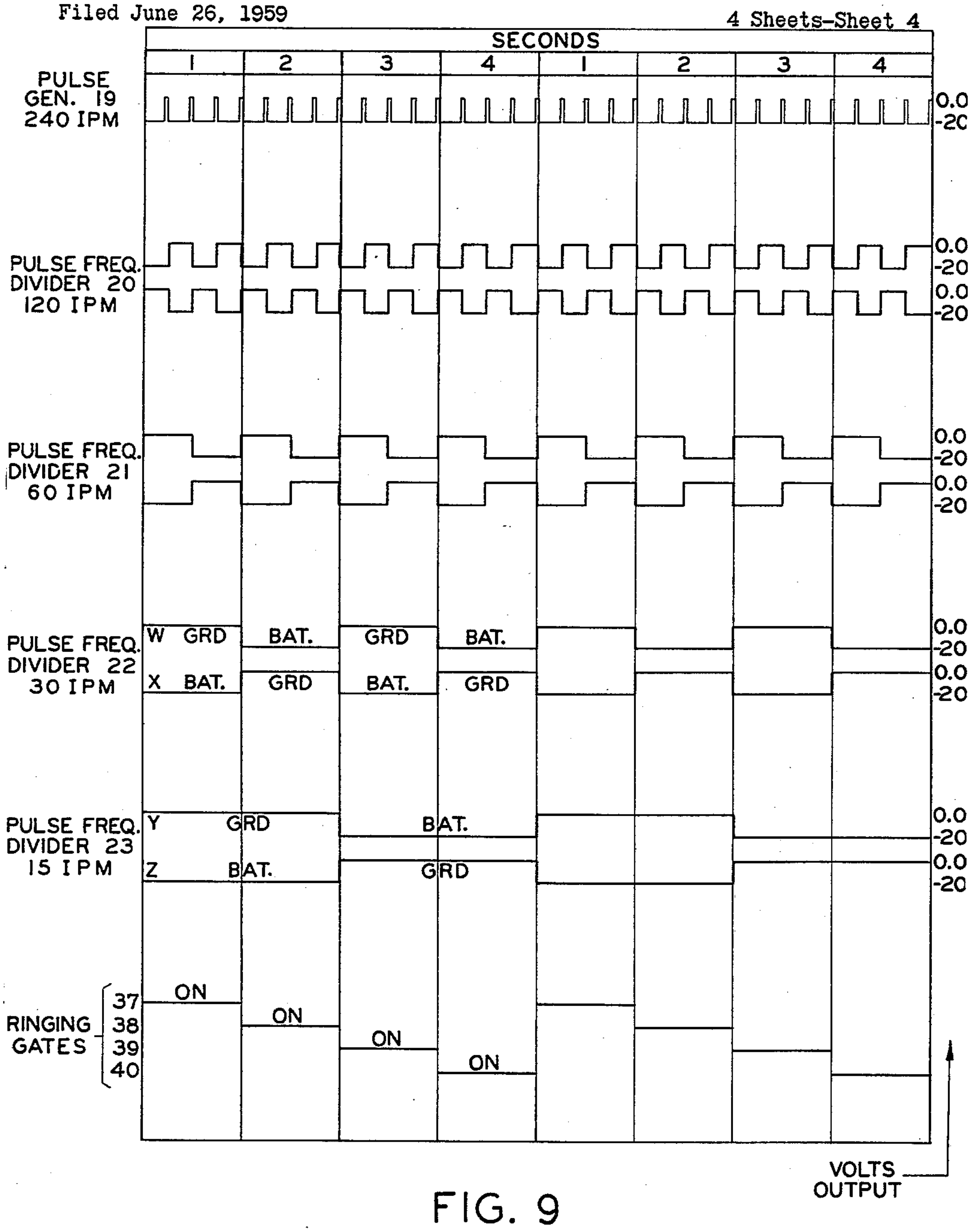

FIGURES 8*a*, 8*b*, 8*c* and 8*d* are schematic representations of the possible conditions of the four transistor circuits utilized in the translator shown in FIGURE 5 and, FIGURE 9 is a pulse chart showing the pulse output of the various components in my signaling system and also showing the co-ordinaton of pulse patterns to establish the desired commutated ringing output.

For the purpose of clarity the general organization of a signaling system embodying my invention will first be described.

Figure 1:
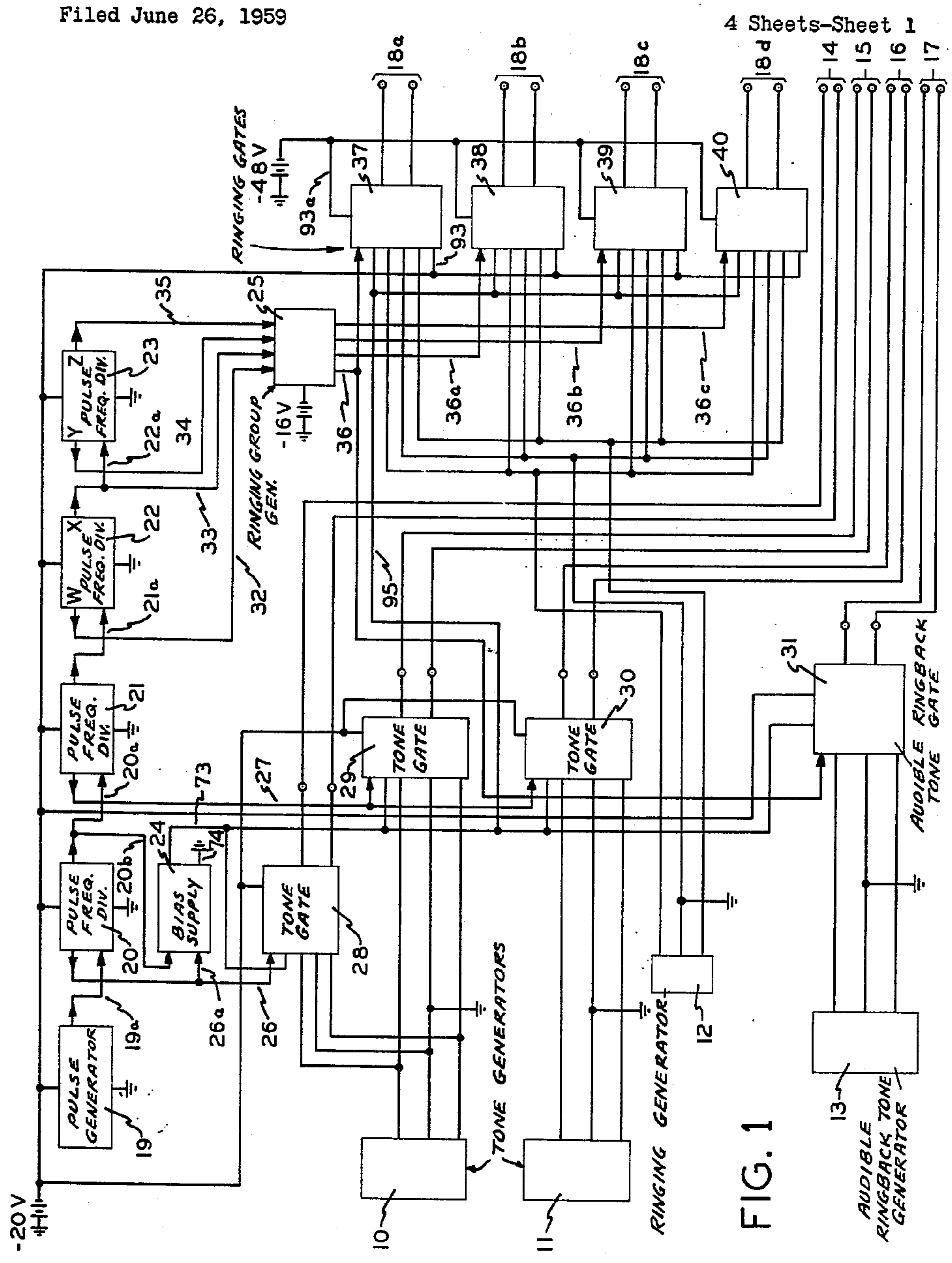
FIGURE 1 is a block diagram of the signaling system according to my invention shown in the present instance as positive grounded.

From FIGURE 1 it will be seen that a signaling system constructed according to the principles of my invention is electrically interposed between suitable frequency generators and signal output terminals, the latter being adapted for connection into a telephone system with which my invention is intended to be used. In the present instance there is shown, for example, a generator 10 for providing low frequency in the nature of 600 cycles per second modulated by 120 cycles per second, generator 11 for providing high tone which is normally 500 cycles per second, generator 12 for providing ringing frequency which is normally 20 cycles per second and generator 13 for providing audible ring back tone which is normally 420 cycles per second modulated by 40 cycles per second.

The output terminals of the system comprise terminals 14 and 15 which supply low tone from generator 10 in two different interruption patterns as will be described presently, terminals 16 which supply high tone in a predetermined interruption pattern, terminals 17 which provide audible ring back tone in a predetermined interruption pattern and ringing output terminals **18*a*, 18*b*, 18*c* and 18*d*** which supply 20 cycle per second ringing energy in a predetermined, commutated ringing pattern.

The signaling system also includes pulsing means which comprises by way of example, a pulse generator 19 arranged to supply 240 pulses per minute and pulse frequency dividers 20, 21, 22 and 23.

Each of the pulse frequency dividers is responsive to negative going wave fronts from the preceding divider. Therefore, dividers 20, 21, 22 and 23 supply, respectively, 120, 60, 30 and 15 impulses per minute to be utilized in a manner to be described presently.

There is also provided, as shown at 25 in FIGURE 1, a ringing group pattern generator which, in conjunction with pulse frequency dividers 22 and 23, establishes a group ringing pattern. In the present instance, for purposes of description, this ringing pattern comprises a four second time span during which each ringing gate is energized for one second and de-energized for three seconds.

As shown in FIGURE 1 pulse generator 19 and pulse frequency dividers 20, 21 and 22 each is connected to the input of the succeeding element by means of trigger input leads **19*a*, 20*a*, 21*a* and 22*a*** respectively. As will be seen presently, the pulse pattern of each component is thus fed into the next succeeding device where it is modified to establish, for example, the group of pulse patterns shown in FIGURE 9 of the drawing.

Certain of the pulse frequency dividers, those shown at 20 and 21, include output leads 26 and 27 respectively. Lead 26 serves to transmit a pulse pattern established by divider 20 to the tone gate 28 which is connected to the low tone generator 10, and lead 27 serves to transmit a pulse pattern generated by divider 21 to tone gates 29 and 30 which are in turn connected respectively to the outputs of the low tone generator 10 and the high tone generator 11. On the other hand, the output leads 32 and 33 of pulse frequency divider 22 and leads 34 and 35 of pulse frequency divider 23 are connected to the input of ringing group pattern generator 25. The output lead 36 of generator 25 is connected to audible ring back gate 31 and output leads **36*a*, 36*b* and 36*c* are connected respectively to ringing gates 37, 38, 39 and 40** to establish divided or commutated ringing as will be seen presently. Further connections of these various circuit elements as shown in FIGURE 1 together with specific functional relationships will be more specifically described as the individual elements are considered hereinafter.

Power of a suitable magnitude is supplied to the system and as shown includes 20 volts D.-C. for the components of the pulsing system and the tone gates 28, 29, 30 and 31; 16 volts D.-C. for the ringing group pattern generator 25 and 48 volts D.-C. to serve as blocking bias for diodes in the circuits of ringing gates 37, 38, 39 and 40.

It will be seen, as a description of my signaling system proceeds, that the pulse generator 19, pulse frequency dividers 20, 21, 22 and 23, together with the ringing group pattern generator 25 and the various tone gates and ringing gates coact in a manner to provide an economical, maintenance free, efficient and novel signaling and ringing system for use in the telephone circuit.

Figure 2:
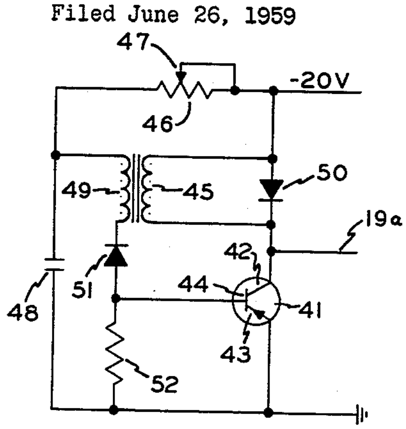
FIGURE 2 is a schematic diagram of the circuit comprising a pulse generator.

FIGURE 2 shows the circuitry of the pulse generator 19 suitable for the practice of my invention. This circuit includes a transistor 41 here shown as the p-n-p type including a collector 42, emitter 43 and base 44. The emitter-collector circuit of the transistor 41 is connected across the 20-volt D.-C. source through primary 45 of a feedback transformer. A relatively large resistor 46 having a variable tap 47 is series connected with a capacitor 48, the latter being connected through secondary 49 of the feedback transformer to the base 44 of transistor 41.

The output of the pulse generator as represented at the trigger output lead **19*a* is essentially a pulse whose amplitude varies from ground (0 volts) and —20 volts. When the circuit is energized the transistor 41** conducts and, due to the phasing of the transformer windings, capacitor 48 is charged. Simultaneously the base 44 of transistor 41 is being driven increasingly negative. Under these conditions the transformer side of the capacitor 48 is impressed with a positive charge by the flow of base current. As charging of the capacitor continues the base current flow diminishes and simultaneously collector current through the transistor decreases causing progressive reduction in base current until the transistor is cut off. At this time the capacitor 48 discharges through the resistor 46 and a potential of —20 volts is impressed upon the trigger output lead 19*a*. Alternately, when transistor 41 is conducting, ground or 0 volts is connected to trigger lead 19*a*. Successive repetitions of the function described above results in the initial pulse generation shown as 240 impulses per minute in FIGURE 9.

It will be understood that variations in the periodicity of the initial pulse may be obtained by adjustment of the tap 47 on the resistor 46 to vary the R-C time constant of the circuit.

As indicated previously extreme fidelity of the generated pulses is required for telephone usage.

To the end that negative voltage spikes on the collector of the transistor be eliminated a blocking diode 50 is incorporated in the circuit across the primary winding 45 of the pulsing transformer.

Another problem encountered in circuits of this type is the tendency of the frequency to drift with temperature variations. An analysis of the circuit for the usage here intended reveals that variation of the resistance in the circuit with temperature variations and particularly that of the transistor results in the frequency drift or change referred to. Since transistor leakage resistance was found in some cases to be a causative factor in frequency drift there is incorporated in the base circuit of the transistor, 41 a diode 51 which essentially disconnects the transistor from the R-C circuit during the capacitor discharge period.

The pulse generating circuit described above has been found to produce the generated pulse with the fidelity required and the importance of the fidelity of this pulse is shown clearly from FIGURE 9. From that figure it will be seen that the initially generated pulse is the basis of the fidelity of modified pulses obtained at succeeding points in the circuitry of the entire system.

Figure 3:
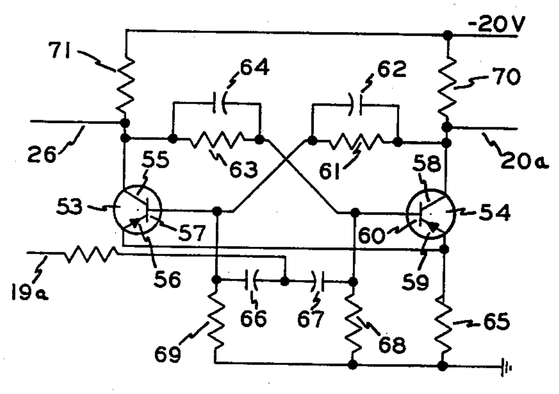
FIGURE 3 is a schematic diagram of the pulse frequency divider circuit.
Figure 4:
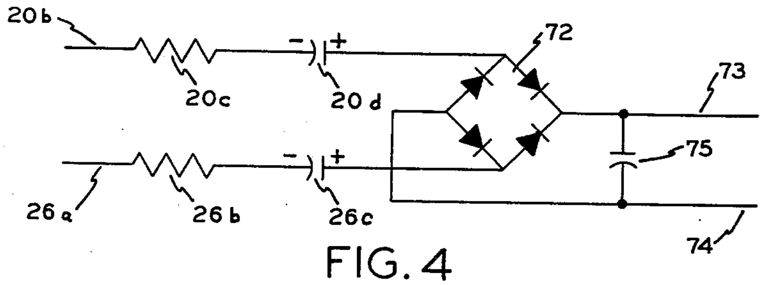
FIGURE 4 is a schematic diagram of the circuit providing positive bias supply utilized in my invention.

The circuit of FIGURE 3 represents the arrangement of the components in the pulse frequency dividers 20, 21, 22 and 23 but will be indicated herein as the circuit in the frequency divider 20 by indication of the trigger input 19*a* which is connected to the output of the pulse generating circuit of FIGURE 2, the output lead 20*a* of which is connected to the input of pulse frequency divider 21 and the output lead 26 of which is connected to the input of the tone gate 28.

As will be seen, this circuit constitutes essentially a bi-stable multivibrator and is so designed as to be triggered by incoming negative wave fronts. By reference to FIGURE 9 it will be seen that these pulse frequency dividers, each being triggered by negative going wave fronts from the output of the device preceding it in the circuit, results in each generating pulses of half frequency or repetition rate of the previous device.

Accordingly, assuming that the pulse frequency generator 19 generates 240 impulses a minute it will be seen that if succeeding pulse frequency dividers are each energized or triggered by negative going wave fronts then the successive pulse frequency dividers 20, 21, 22 and 23 will generate 120, 60, 30 and 15 impulses per minute respectively.

Referring now to FIGURE 3 it will be seen that the circuitry of the pulse frequency dividers 20, 21, 22 and 23 is essentially that of a bi-stable multivibrator having two transistors 53 and 54 each provided with collectors 55 and 58 respectively, emitters 56 and 59 respectively and bases 57 and 60 respectively. A resistor 61 having a shunt connected capacitor 62 is connected between the collector 58 of transistor 54 and the base 57 of transistor 53 while a resistor 63 having a shunt connected capacitor 64 is connected between the collector 55 of transistor 53 and the base 60 of transistor 54. These resistor-capacitor combinations serve as feedback elements as will be seen presently.

An emitter bias resistor 65 is connected between ground and the respective emitters of transistors 53 and 54 while trigger coupling capacitors 66 and 67 are connected between the trigger input 19*a* and the bases of the respective transistors. Suitable base return resistors 68 and 69 are connected between ground and the respective bases of the transistors while collector load resistors 70 and 71 are shown connected between the —20 volt input lead and the respective collectors of said transistors.

Assuming that the circuit of FIGURE 3 is energized both transistors will conduct, however one, because of inherent asymmetry will conduct more than the other. Further assuming that transistor 53 conducts more than transistor 54 transistor 53 will become more conducting while transistor 54 shuts off to attain the first stable condition. This action occurs because as transistor 53 conducts the collector 55 thereof becomese more positive causing the base 60 of transistor 54 to become more positive. As a result of this action transistor 53 increases in conductance and transistor 54 is driven to "off" or nonconducting condition. As this occurs the collector 58 of transistor 54 becomes more negative. This causes the base of transistor 53 to become more negative and thus increases the conduction of that transistor.

The foregoing condition persists until transistor 53 reaches saturation and transistor 54 reaches cut-off.

While transistor 53 is conducting base current will flow through the resistor 61 and a charge will be applied to its companion capacitor 62. Because of the nonconducting condition of transistor 54 there is no base current flow and thus no voltage drop across resistor 63 and no charge on capacitor 64.

At this time the slight drop across the small resistance 65 assures relative negative potential on the emitter of the nonconductive transistor 54 with respect to its base to further assure nonconductance.

Upon the impression of a negative wave front from pulse generator 19 through lead 19*a* to trigger the circuit shown in FIGURE 3, current is drawn through capacitors 66 and 67 as they charge. As a result of this, the flow of charging current through capacitor 67 to the base of transistor 54 renders the latter more negative and thus transistor 54 is turned on. However, the charge on capacitor 62 is now available to supply positive bias to the base of transistor 53 with the result that transistor 53 is positively shut off while transistor 54 is rendered conducting. Under these conditions capacitor 64 is now being charged so that it is available to cut-off transistor 54 on the next cycle.

From the foregoing it will be understood that the continued application of negative wave fronts will bring about the alternate stable conditions described above and, as shown in FIGURE 1, since the output of each device constitutes the triggering input of the next succeeding device, the latter will generate pulses of half the frequency or repetition rate of the preceding pulse frequency dividers. As a result of the above described operation, output leads 20*a* and 26 are each alternately subjected to —20 volt (battery) and 0 volt (ground) potential. Furthermore, while one of these stable conditions is being applied to one of the leads, the other condition is being applied to the other lead. This cycle of operation applies also to pulse frequency dividers 21, 22 and 23 except of course that a different impulse rate is involved.

As shown in FIGURE 1 an output lead 20*b* is connected to the lead 20*a* of frequency divider 20 and serves as an input to the positive bias supply 24 while lead 26*a* serves as the other input to the positive bias supply, being connected to output lead 26 of the pulse frequency divider 20.

It will be understood that while the positive bias supply is here shown connected to the pulse frequency divider 20 which supplies 120 impulses per minute it could conveniently receive its energy from any of the other pulse frequency dividers within the contemplation of my invention.

The desirability of the positive bias supply is dictated by the fact that, as shown herein and very often in practice, the system into which my invention is incorporated is positive grounded and therefore the voltages encountered are negative with the respect to ground. Since, as will be seen presently, p-n-p transistors requiring a positive voltage for cut-off are utilized in various parts of the circuit of which it is necessary to generate and make available positive voltage to assure cut-off of these transistors.

The positive bias supply constitutes essentially a full wave rectifier having input leads 20*b* and 26*a* as described above. These leads are energized on alternate half cycles through the pulse frequency divider from the 20 volt input supply and are provided with current limiting resistors 20*c* and 26*b* respectively together with input capacitors 20*d* and 26*c* respectively. When the bias supply circuit is energized the capacitors 20*d* and 26*c* are charged to the polarities shown and by means of the full wave rectifier 72 one side of which is grounded at lead 74, the bias supply input, alternating between 0 and —20 volts will be rectified and supplied as positive voltage. If desired an output filter 75 may be incorporated in the circuit to increase the constancy of the output.

As shown in FIGURE 1 the lead 73 from the positive bias supply is connected to the tone gates 28, 29, 30 and 31 and to ringing gates 37, 38, 39 and 40.

From the foregoing it will be seen that I have provided in the signaling system of my invention means for generating pulses of a predetermined repetition rate whereby the generated pulses are produced with fidelity and the frequency thereof is unaffected by temperature changes and by varying leakage resistance within the current controlling device represented by the transistor 41. Additionally, I have provided in conjunction therewith pulse frequency dividing means responsive to incoming negative impulses whereby the generated pulses can be successively reduced by one half in repetition rate. Additionally, there is provided a positive bias supply operated from impulses varying in amplitude between 0 volts or ground and substantially —20 volts.

To the end that commutated ringing may be obtained there is provided a ringing group pattern generator 25, the circuitry of which is shown in FIGURE 5.

As will be seen from FIGURE 1 the input of the generator 25 comprises leads 32, 33, 34 and 35 representing the output leads of pulse frequency dividers 22 and 23.

As described above the pulse frequency generator 19 supplies 240 impulses per minute and the pulse frequency divider 20, 120 impulses per minute since the latter, like dividers 21, 22 and 23, is responsive only to negative going pulses. Again, referring to FIGURE 9 it will be seen that the pulse frequency divider 21 therefore generates 60 impulses per minute, divider 22 generates 30 impulses per minute and divider 23, 15 impulses per minute.

In FIGURE 5 there is shown the circuitry of ringing group pattern generator means 25 which is utilized in my invention to establish commutated ringing. This circuitry includes four separate conductors energized independently from a 16 volt D.-C. source and each connecting to one of the ringing gates 37, 38, 39 and 40. Four conductors are shown since, by way of example, a four second ringing group pattern is being used in the present instance.

Each of the translator circuits includes a transistor shown at 76, 77, 78 and 79 respectively, each transistor being provided with collectors 80, 81, 82 and 83 respectively, emitters 84, 85, 86 and 87 respectively and base electrodes 88, 89, 90 and 91 respectively. The base leads of each of the transistors is connected to a diode and resistor arranged in parallel to each other and in turn connected to at least two of the four outlet terminals of pulse frequency dividers 22 and 23. These terminals will be designated, for purposes of clarity as W, X, Y and Z, representing the connections of leads 32, 33, 34 and 35 respectively to pulse frequency dividers 22 and 23. It will be noted that the translator circuits are, through leads 36, 36*a*, 36*b* and 36*c*, individual to each of the respective ringing gates 37, 38, 39 and 40 and are connected thereto by the collector lead of the respective transistor. Additionally, lead 36 is connected to audible ringing gate 31 to impress the ringing interruption pattern as will be described presently.

Diodes 76*a*, 77*a*, 78*a* and 79*a* are connected to the base leads of transistors 76, 77, 78 and 79 respectively while resistors 76*b*, 77*b*, 78*b* and 79*b* are connected to the respective base leads. It will be noted that the polarity of the respective diodes is such as to pass current in a direction away from the base lead of the respective diode.

From FIGURE 5 it will be seen that the diode 76*a* and resistor 76*b* of transistor 76 are connected respectively to output terminals X and Z of the pulse frequency dividers 22 and 23; diode 77*a* and resistor 77*b* of transistor 77 respectively to terminals W and Z; diode 78*a* and resistor 78*b* of transistor 78 respectively to terminals X and Y and diode 79*c* and resistor 79*b* respectively of transistor 79 to terminals W and Y of those pulse frequency dividers.

As previously described in conjunction with FIGURE 3, each of the pulse frequency dividers is provided with two output leads shown in FIGURE 3 as 26 and 20*a* respectively. Also, as previously described each output is impressed alternately with —20 volts when the respective transistor 56 or 54 is shut off and 0 volts or ground when the respective transistor 56 or 54 is conducting. Additionally, from the operation of the bi-stable multivibrator circuit shown in FIGURE 3 these two stable conditions as impressed upon the respective output leads 26 and 20*a* are alternating in nature so that as one output is connected to ground the other is connected to battery and vice versa. It will be understood that the operation and conditions explained in conjunction with FIGURE 3 apply equally to the circuits of pulse frequency dividers 22 and 23, the only difference being that divider 22 generates 30 impulses per minute and divider 23 generates 15 impulses per minute. From the foregoing it will be seen that, because of the translator circuitry described above, various combinations of ground and battery connections can be impressed upon the translator circuits from frequency dividers 22 and 23.

These combinations are shown clearly in FIGURE 9. From that figure it will be seen that during the first second of a given four second time span, terminals W and Y are ground connected because of the operation of the transistors in the respective pulse frequency dividers. During the next second, terminals X and Y are ground connected. During the third second, terminals W and Z are ground connected while during the fourth second terminals X and Z are ground connected.

By reference to FIGURES 5 and 9 it will be understood that for commutated energizing of the ringing gates 37, 38, 39 and 40 it is desirable that only one gate be energized during each one second period and that during a given four second time span each of the gates be energized for a one second period therein. This is accomplished herein by controlling the emitter-collector conduction period of each transistor 76, 77, 78 and 79.

In FIGURES 8(*a*), 8(*b*), 8(*c*) and 8(*d*) the electrical condition of the respective diode-resistor circuit for each ringing group pattern generator circuit is shown. It is to be understood that the conditions shown in FIGURE 8 are those occurring in a given one second period as shown in FIGURE 9. However, it will also be understood that each of the conditions described in conjunction with FIGURE 8 is impressed successively on each of the ringing group pattern generator circuits during each four second time span.

The transistors 76, 77, 78 and 79 being of the n-p-n type, will be rendered conducting under those conditions where the base voltage is positive with respect to emitter voltage.

Referring specifically to FIGURE 8*a* it will be seen that when divider output terminals W and Y are connected to ground, base current flows through resistor **79*b*. Under these circumstances, because of the presence of the diode 79*a* and its polarity as shown, base-emitter current will flow thus rendering the emitter-collector path of the transistor 79 conducting. Since the transistor 79 conducts, lead 36 is energized to establish a ringing connection through gate 37**.

In FIGURE 8*b* the diode **78*a* and resistor 78*b* are connected respectively to terminals X and Y and from FIGURE 9 it will be seen that X is connected to the battery while Y is connected to ground. Under these circumstances, due to the polarity of the diode 78*a* there will be a flow of current from ground through the resistor 78*b*, diode 78*a* to battery and the base lead of the transistor 78 will be bypassed. Therefore, the base 90 will be more negative than the emitter 82 and the transistor 78** will thus be driven to nonconducting condition.

From FIGURE 9 and FIGURE 8*c* it will be seen that during this second the diode **77*a*, being connected to terminal W, will be ground connected while the resistor 77*b*, being connected to terminal Z will be connected to battery. Under these circumstances control current from ground to the base of the transistor will be blocked by diode 77*a*** with the result that that transistor is rendered nonconducting.

Under conditions shown in FIGURE 8*d*, diode **76*a* being connected to the terminal X and resistor 76*b* being connected to terminal Z, it will be seen that the diode is connected to battery as is the resistor. Under these circumstances due to the lack of potential, base current is nonexistent and transistor 76** is also rendered nonconducting.

From the foregoing it will be seen that during the one second period discussed above, that is, the first one second period shown in FIGURE 9, only transistor 79 and its associated circuit will be rendered conducting, all others being nonconducting for the reasons given above. As will be seen presently, the respective ringing gate connected to leads 36, **36*a*, 36*b* or 36*c* will be energized or nonconducting depending on the "on" or "off" condition of the respective transistor 76, 77, 78 and 79**.

Due to the operation of the pulse frequency divider, the diode and resistor connections described above are changed or rotated for each period of one second. This is clearly shown in FIGURE 9, where, during the next second it will be seen that terminals X and Y are ground connected. Reference to FIGURE 5 will show that diodes **78*a* and 78*b* are connected respectively to these terminals. This being the case, during the second period transistor 78 will conduct to energize ringing gate 38**. During this second however, by reference to FIGURE 9 it will be seen that the other three conditions explained in conjunction with FIGURE 8 will exist on all other transistors and thus they will be rendered nonconducting.

The circuitry thus far described is devoted to the generation of impulses or a commutated ringing pattern all of which serves as a supply or control for tone gates 28, 29, 30 and 31 or ringing gates 37, 38, 39 and 40 whereby pre-established tone or ringing signal is modified in accordance with the established requirements of a telephone system.

The impulses resulting from the devices described above, therefore, determine the ability of the respective tone or ringing gates to conduct or block the particular frequency signal from the respective tone or ringing frequency generator to the respective output terminals.

Figures 6, 7:
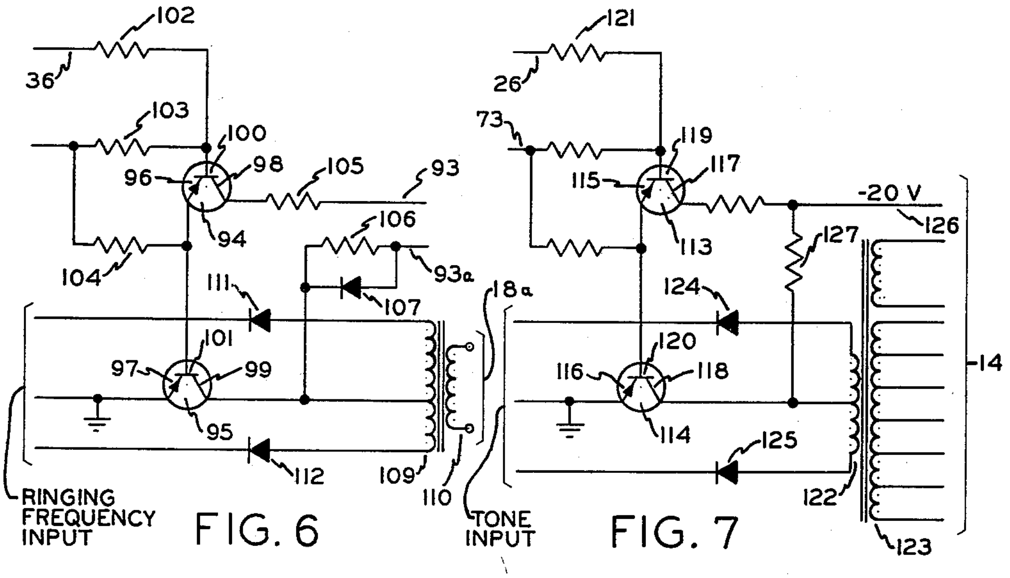
FIGURE 6 is a schematic diagram of the circuit of a ringing gate utilized in my invention.
FIGURE 7 is a schematic diagram of the circuit of a tone gate utilized in my invention.

The circuitry of each of the ringing gates 37, 38, 39 and 40 is the same and is shown in FIGURE 6 while that of the tone gates 28, 29, 30 and 31 is that shown in FIGURE 7.

Referring first to FIGURE 6 which is representative of the circuitry in any of the ringing gates it will be seen that there is provided a pair of transistors 94 and 95 having emitters 96 and 97 respectively, collectors 98 and 99 respectively and base electrodes 100 and 101 respectively. These transistors as shown herein are of the p-n-p type, however, it will be understood that, as in the case of all other portions of the circuit transistors of the opposite type may be utilized equally as well upon the reversal of all other polarities shown in the circuit.

A pulse input lead 36 having a current limiting resistor 102 is connected to the lead of the base 100 of transistor 94. Positive bias from the positive bias supply 24 is connected to the base of transistor 94 through bias resistor 103 and to the base 101 of the transistor 95 through bias resistor 104.

The collector 98 of transistor 94 is connected through resistor 105 and lead 93 to the 20 volt D.-C. supply while the collector 99 of resistor 95 is connected through resistor 106, parallel connected diode 107 and lead **93*a*** to the 48 volt D.-C. supply.

The transistor 95 is connected in the grounded intermediate wire of the three wire ringing frequency input from the ringing frequency generator 12 while the resistor diode combination shown at 106 and 107 is likewise connected to this intermediate wire. As shown, the three wire system terminates in the primary 109 of a suitable ringing output transformer 110 and diodes 111 and 112 are provided in the outer wires of the three wire system and poled to pass current in alternate half cycles from each end of the primary winding 109 as ringing frequency is fed through the emitter-collector path of the transistor 95 to an intermediate tap of said primary coil.

In operation, a negative impulse is impressed upon the base 100 of transistor 94 to render it conducting whereupon that transistor through its emitter-collector path renders the base 101 of transistor 95 negative with respect to emitter 97. Under these circumstances transistor 95 is rendered conducting and ringing frequency energy is impressed upon the ringing output transformer 110. Upon cessation of the pulse, the positive bias supply through resistors 103 and 104 renders transistors 94 and 95 respectively nonconducting.

In this manner the impulse pattern impressed upon lead 36 establishes the one second "on" periodicity of ringing gate 37 during the before-mentioned four second time span.

During the one second period described above, it will be understood from the previous explanation of the ringing group pattern generator 25 that the other ringing gates will be rendered nonconducting. As explained previously the "on" or conducting condition of ringing gate 37 is then sequentially and successively impressed upon succeeding ringing gates to establish the ringing group pattern shown in FIGURE 9.

The tone gates utilized herein, the circuitry of which is shown in FIGURE 7, operate on the same principles as those above described in conjunction with the ringing gate shown in FIGURE 6. These tone gates include transistors 113 and 114 including respectively emitters 115 and 116, collectors 117 and 118 and base electrodes 119 and 120.

The negative pulse impressed upon leads 26 and current limiting resistor 121 is applied to the base of transistor 113 to render it conducting. Transistor 113 then, through its emitter collector circuit renders 114 conducting whereupon the tone input is applied, through the three wire system to tone output transformer primary 122. It will be noted that the secondary of this transformer shown at 123 may be provided with a plurality of taps whereby various degrees of tone energy may be obtained for transmission to the telephone system. Again diodes such as those at 124 and 125 are provided in the output leads of the three wire tone connection and again, as in the case of lead *93a* of FIGURE 6 blocking bias for the diodes 124 and 125 is supplied through lead 126 and resistors 127.

Thus it will be seen that pulses generated in the pulse generator 19 initiate varying impulse patterns in pulse dividers 20, 21, 22 and 23 and that these varying impulse patterns are fed to different portions of the signaling circuit whereby the desired, ultimate tone patterns or ringing group patterns are supplied to the various terminals.

More specifically and by way of example, pulses are generated at 19 at the rate of 240 pulses per minute. Due to the circuitry previously described the pulse frequency dividers 20, 21, 22 and 23 supply respectively 120, 60, 30 and 15 impulses per minute, these impulse supplies being characterized by the fidelity of the pulses generated at 19.

Tone gates 28 and 29 are both connected to the output of tone generator 10 which supplies frequency of 600 cycles per second modulated at 120 cycles per second. Since tone gate 28 is connected to pulse frequency divider 20 which supplies 120 impulses per minute it follows that tone gate 28 will supply a tone frequency of 600 cycles per second modulated at 120 cycles per second modified by 120 impulses per minute for an all trunks busy signal. On the other hand tone gate 29 which supplies the same frequency but is connected to pulse frequency divider 21 which supplies 60 impulses per minute will supply the same frequency at 60 impulses per minutes to provide busy tone.

Tone gate 30 is connected to the output of high frequency generator 11 which supplies a frequency of 500 cycles per second. It is likewise operatively connected with pulse frequency divider 21 and therefore supplies high tone of 500 cycles per second modified by 60 impulses per minute which is available for certain test purposes in the telephone system with which my signaling system operates.

The tone gate 31 is connected to the output of audible ring back tone generator 13 while the input thereof is connected to an output of the ringing group pattern generator 25 by means of lead 36. Under these conditions it will be understood that the ringing group pattern established is impressed upon the audible ring back gate 31.

As indicated previously, while the pulse frequency dividers 22 and 23 supplying 30 and 15 impulses per minute respectively supply the ringing group pattern generator 25 to create a ringing group pattern in accordance with FIGURE 9, these dividers also may be connected to tone gates to modify any of the tones supplied into the system by their impulse characteristics. In the present instance, however, the use of dividers 22 and 23, for the purpose of illustrating the establishment of a ringing group pattern are shown connected only to the generator 25 while the latter is in turn connected to supply pulses to ringing gates 37, 38, 39 and 40 in accordance with the operation of the circuit shown in FIGURE 5.

From the foregoing it will be seen that I have provided an improved interrupter system for telephone circuits which is characterized by the high fidelity of the signals impressed upon the telephone circuit, minimum of maintenance requirements and which is extremely flexible in its adaptability to a wide variety of tones and tone patterns and a wide variety of ringing patterns.

The specific embodiment of my invention shown herein, is given merely by way of example, and numerous changes in the details of construction and the combination and arrangement of parts may be resorted to without departing from the spirit and scope of my invention as hereinafter claimed.

What I claim is:

1. In a signaling circuit for telephony, in combination, pulse generator means for supplying pulses of predetermined periodicity, pulse frequency divider means having pulse output means and pulse input means responsive to like-going pulse supply from said pulse generator means, means for electrically connecting said pulse generator means to said divider means, signal frequency generator means, gate means for said signal frequency generator means, means for connecting said gate means to a telephone system, means for electrically connecting said gate means to said signal frequency generator means to receive a signal therefrom, ringing group generator means having input and output means, means for connecting said output of said ringing group generator means to gate means, means for connecting the input of said ringing group generator means to pulse output means of pulse frequency divider means to establish a group ringing pattern at certain gate means, means for connecting the output of said divider means to other gate means to energize and de-energize the same in accordance with the pulse supply of said divider means to supply a frequency signal from frequency generator means in a pattern modified by the energizing of said gate means.

2. In a signaling circuit for telephony, in combination, pulse generator means, trigger pulse responsive, bi-stable multivibrator means, means for electrically connecting said pulse generator means to said multivibrator means for supplying trigger pulses to said multivibrator means, gate means, means for connecting said multivibrator means to said gate means for energizing and de-energizing said gate means in accordance with pulses impressed thereon by said multivibrator means, signal frequency generator means, ringing group generator means having input and output means, means for connecting said output means to said gate means, means for connecting said input of said ringing group generator to the output of said multivibrator means to establish a group ringing pattern at said gate means, means for electrically connecting said signal frequency generator means to said gate means, and means connecting said gate means to a telephone system to impress on said system signaling frequency from said frequency generating means in an impulse pattern according to the energizing of said gate means by said pulses from said multivibrator means.

3. In a signaling circuit for telephony adapted to receive a plurality of signal frequencies and supply such frequencies in a plurality of pulse and ringing group patterns to a telephone system, in combination, pulse generator means having a power input and a trigger pulse output; pulse frequency divider means including a plurality of bi-stable multivibrator elements each having a trigger output for each stable condition thereof, a trigger pulse input and a power input; means for electrically connecting the trigger pulse output of said pulse generator to the trigger pulse input of one of said dividers, means for connecting a trigger output of each divider to the trigger input of the divider next succeeding it in the circuit, a plurality of signal frequency generator means each having a signal output, ringing group generator means having input and output means; a plurality of gate means each having a power input, a signal output for connection to a telephone system, a frequency signal input and a trigger pulse input; means for electrically connecting the signal output of each of said signal frequency generating means to the frequency signal input of one of said gate means, means for electrically connecting the other trigger pulse output of each divider to the trigger pulse input of certain of said gate means to energize and de-energize the respective gate means in accordance with the pulse output of the respective divider means and to supply, through the respective signal output, signals of the respective frequency according to the pulse patterns established by the supplied pulses from the respective pulse frequency divider means for connecting the input of said ringing group generator means to the trigger output of certain of said pulse frequency divider means and means for connecting the output of said ringing group generator means to certain of said gate means to establish a group ringing pattern at said gate means.

4. In a signaling circuit for telephony adapted to establish a ringing group pattern which comprises a predetermined time span wherein only one of a plurality of ringing groups is energized during successive, predetermined fractions of said time span and wherein each ringing group is energized at least once during said time span, in combination, pulse generator means having a power input and a trigger pulse output, pulse frequency divider means including a plurality of bi-stable multivibrator means, each having a trigger pulse output for each stable condition thereof and a trigger pulse input responsive to like-going pulse waves supplied thereto, said trigger pulse outputs being alternately and severally subjected to each such stable condition, said stable conditions including one of less and one of higher voltage output, means for electrically connecting the trigger pulse output of the pulse generating means to the trigger pulse input of the next multivibrator means in succeeding relationship in the circuit and means for connecting a trigger pulse output of each multivibrator means to the trigger pulse input of the next multivibrator means to supply the pulse output of each to the next succeeding device in the circuit, ringing frequency generator means, ringing gate means for each ringing group to be established, means for electrically connecting said ringing frequency generator means to each ringing gate means to supply ringing frequency thereto, means for connecting the ringing gate means to a telephone system, a ringing group generator having a circuit therein for each ringing group to be established, each said circuit including a power source of predetermined voltage, a semi-conductive cut-off device and the respective ringing gate, said semi-conductive devices including transistors each having emitter, collector and base electrodes, the emitter-collector circuit of each comprising the conductor between the power source and the respective ringing gate, a pair of conductors connected to the base electrode of each of said transistors, means for connecting one of each pair of said conductors to one trigger output of a different one of said multivibrator means and electrically unidirectional means connected in one of each pair of said conductors between the respective base electrode and the respective multivibrator trigger output.

5. In a signaling circuit for telephony adapted to establish a ringing group pattern which comprises a predetermined time span wherein only one of a plurality of ringing groups is energized during successive, predetermined fractions of said time span and wherein each ringing group is energized at least once during said time span, in combination, pulse generator means having a power input and a trigger pulse output, pulse frequency divider means including a plurality of bi-stable multivibrator means, each having a trigger pulse output for each stable condition thereof and a trigger pulse input responsive to like-going pulse waves supplied thereto, said trigger pulse outputs being alternately and severally subjected to each such stable condition, said stable conditions including one of lesser and one of higher voltage output, means for electrically connecting the trigger pulse output of the pulse generating means to the trigger pulse input of the next multivibrator means in succeeding relationship in the circuit and means for connecting a trigger pulse output of each multivibrator means to the trigger pulse input of the next multivibrator means to supply the pulse output of each to the next succeeding device in the circuit, ringing frequency generator means, ringing gate means for each ringing group to be established, means for electrically connecting said ringing frequency generator means to each ringing gate means to supply ringing frequency thereto, means for connecting the ringing gate means to a telephone system, a ringing group generator having a circuit therein for each ringing group to be established, each circuit including a source of unidirectional voltage, a transistor and the respective ringing gate, said transistors each including emitter, collector and base electrodes, means for electrically connecting each emitter to said source of voltage and means for connecting each collector to the respective ringing gate to provide a circuit between said source of voltage and the respective ringing gate through the emitter-collector path of the respective transistor, means for supplying control current to the bases of said transistors including a pair of conductors connected to the base of each transistor, one of the conductors in each pair having electrically unidirectional means associated therewith and means for connecting each conductor of each pair to a trigger pulse output terminal of a different pulse frequency divider.

6. In a signaling circuit for telephony, in combination, pulse generator means, pulse responsive pulse frequency divider means, means for supplying pulses from said pulse generator means to said pulse frequency divider means, gate means, means for establishing an energizing and de-energizing relationship between said pulse frequency divider means and gate means whereby energizing of the gate means is in accordance with the output of said pulse frequency divider means, signal frequency generator means, means for connecting the signal frequency generator means to gate means, ringing group generator means having input and output means, means for establishing an energizing and de-energizing relationship between the output of said ringing group generator means and gate means whereby energizing of the gate means is in accordance with the output of said ringing group generator means, means for establishing an energizing and de-energizing relationship between said pulse frequency divider means and said ringing group generator means whereby energizing of the ringing generator means is in accordance with the output of said pulse frequency divider means and means connecting the gate means to a telephone system to impress on said system signaling frequency from frequency generator means in an impulse pattern according to the energizing of the gate means.

7. In a signaling circuit for telephony, in combination, pulse generator means, pulse responsive pulse frequency divider means, means for connecting said pulse generator means to said pulse frequency divider means for supplying pulses thereto, gate means, means for connecting said pulse frequency divider means to gate means for energizing and de-energizing said gate means in accordance with pulses impressed thereon by pulse frequency divider means, signal frequency generator means, means for connecting the signal frequency generator means to gate means, ringing group generator means having input and output means, means for connecting the output of said ringing group generator means to gate means, means for connecting the input of said ringing group generator means to the output of pulse frequency divider means to establish a group ringing pattern at said last named gate means and means connecting the gate means to a telephone system to impress on said system signaling frequency from frequency generator means in an impulse pattern according to the energizing of the gate means.

8. In a signaling circuit for telephony, in combination, pulse generator means, trigger pulse responsive, bi-stable multivibrator means, means for connecting said pulse generator means to said multivibrator means for supplying pulses thereto, gate means, means for energizing and de-energizing gate means in response to the output of said multivibrator means, signal frequency generator means, ringing group generator means having input and output means, means for energizing gate means in accordance with the output of said ringing group generator means, means for energizing said ringing group generator means in accordance with the output of said multivibrator means to establish a group ringing pattern at said gate means, means for connecting said signal frequency generator means to gate means and means for connecting said gate means to telephone system to impress on said system signaling frequency from said frequency generator means in an impulse pattern according to the energizing of said gate means by the output of said multivibrator means.

9. In a signaling circuit for telephony, in combination, a pulse generator, pulse frequency divider means responsive to pulse supply from said generator and having pulse output means, means for supplying pulses from said generator to pulse frequency divider means, gate means, signal frequency generator means, means for supplying signals from said last named generator means to said gate means, means for establishing an energizing and de-energizing relationship between the pulse output means of said pulse frequency divider means and said gate means whereby energizing of said gate means is in accordance with the output of said pulse frequency divider means, means for supplying signals from said gate means to a telephone communication system whereby signal frequencies are supplied to said system from said signal frequency generator means, through said gate means, in a pattern according to the energizing of said gate means by said pulse frequency divider means.

References Cited in the file of this patent

UNITED STATES PATENTS

| | | |
|---|---|---|
| 2,521,789 | Grosdoff | Sept. 12, 1950 |
| 2,677,768 | Davison | May 4, 1954 |
| 2,832,838 | Trousdale | Apr. 29, 1958 |
| 2,848,616 | Tollefson | Aug. 19, 1958 |